United States Patent
Islam

(10) Patent No.: US 9,235,021 B2
(45) Date of Patent: Jan. 12, 2016

(54) OPTICAL FIBER / ELECTRICAL COMPOSITE CABLE ASSEMBLY WITH SEALED BREAKOUT KIT

(71) Applicant: Andrew LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 13/832,665

(22) Filed: Mar. 15, 2013

(65) Prior Publication Data
US 2014/0140664 A1    May 22, 2014

Related U.S. Application Data

(63) Continuation-in-part of application No. 13/791,248, filed on Mar. 8, 2013.

(60) Provisional application No. 61/728,020, filed on Nov. 19, 2012.

(51) Int. Cl.
G02B 6/44    (2006.01)
G02B 6/36    (2006.01)
H02G 3/02    (2006.01)

(52) U.S. Cl.
CPC ............ *G02B 6/4471* (2013.01); *G02B 6/36* (2013.01); *H02G 3/02* (2013.01); *G02B 6/4416* (2013.01); *Y10T 29/4989* (2015.01)

(58) Field of Classification Search
CPC ...... G02B 6/4471; G02B 6/36; G02B 6/4416; H02G 3/02

USPC .......................................................... 385/86
See application file for complete search history.

(56) References Cited

U.S. PATENT DOCUMENTS

| | | | |
|---|---|---|---|
| 4,373,777 | A | 2/1983 | Borsuk et al. |
| 4,695,127 | A | 9/1987 | Ohlhaber et al. |
| 5,324,932 | A * | 6/1994 | Niewisch .................. 250/227.21 |
| 5,418,878 | A | 5/1995 | Sass et al. |
| 5,467,420 | A | 11/1995 | Rohrmann et al. |
| 5,468,913 | A | 11/1995 | Seaman et al. |
| 5,473,718 | A | 12/1995 | Sommer |
| 5,539,851 | A | 7/1996 | Taylor et al. |
| 5,649,042 | A * | 7/1997 | Saito ............................. 385/109 |
| 5,915,055 | A | 6/1999 | Bennett et al. |
| 6,278,831 | B1 * | 8/2001 | Henderson et al. ........... 385/139 |
| 6,326,550 | B1 | 12/2001 | Dyer et al. |

(Continued)

OTHER PUBLICATIONS

Sung Chul Kang, International Search Report for PCT/US13/61331, Jan. 20, 2014, Daejeon Metropolitan City, Republic of Korea.

(Continued)

*Primary Examiner* — Peter Radkowski
(74) *Attorney, Agent, or Firm* — Babcock IP, PLLC

(57) ABSTRACT

A cable breakout kit has a cable portion, an inner wall portion and a furcation portion with at least one fiber port. The cable portion and the furcation portion are dimensioned to couple with one another, enclosing a furcation area. The inner wall portion is coupled to the furcation portion and a fiber bundle of the cable, enclosing a fiber area within the furcation area; the fiber area is coupled to the at least one fiber port. An assembly including a cable with a fiber and an electrical conductor utilizes a transition housing to pass the fiber and conductor to respective furcation tubes, isolated from one another.

9 Claims, 12 Drawing Sheets

(56) References Cited

U.S. PATENT DOCUMENTS

| | | | |
|---|---|---|---|
| 6,389,214 B1* | 5/2002 | Smith et al. | 385/136 |
| 6,438,299 B1 | 8/2002 | Brown et al. | |
| 6,738,555 B1* | 5/2004 | Cooke et al. | 385/136 |
| 6,909,828 B2* | 6/2005 | Zimmel et al. | 385/100 |
| 7,035,510 B2* | 4/2006 | Zimmel et al. | 385/100 |
| 7,270,485 B1* | 9/2007 | Robinson et al. | 385/55 |
| 7,409,127 B1* | 8/2008 | Hurley et al. | 385/101 |
| 7,494,284 B2* | 2/2009 | Robinson et al. | 385/53 |
| 7,711,236 B2* | 5/2010 | Gonzalez et al. | 385/137 |
| 7,738,759 B2 | 6/2010 | Parikh et al. | |
| 7,903,925 B2 | 3/2011 | Cooke et al. | |
| 7,955,004 B2 | 6/2011 | DiMarco | |
| 8,155,490 B2 | 4/2012 | de Jong et al. | |
| 8,155,525 B2* | 4/2012 | Cox | 398/115 |
| 8,267,596 B2 | 9/2012 | Theuerkorn | |
| 8,364,000 B2* | 1/2013 | Gonzalez et al. | 385/137 |
| 8,401,353 B2* | 3/2013 | Barker et al. | 385/110 |
| 8,818,156 B2* | 8/2014 | Nave | 385/134 |
| 2003/0210875 A1 | 11/2003 | Wagner et al. | |
| 2004/0197066 A1 | 10/2004 | Daoud | |
| 2005/0002621 A1* | 1/2005 | Zimmel et al. | 385/100 |
| 2005/0031276 A1* | 2/2005 | Zimmel et al. | 385/100 |
| 2005/0276551 A1 | 12/2005 | Brown et al. | |
| 2008/0138020 A1* | 6/2008 | Robinson et al. | 385/106 |
| 2008/0138026 A1 | 6/2008 | Yow et al. | |
| 2009/0011639 A1* | 1/2009 | Ballard et al. | 439/607 |
| 2009/0103881 A1* | 4/2009 | Gonzalez et al. | 385/137 |
| 2010/0092135 A1* | 4/2010 | Barker et al. | 385/76 |
| 2010/0092136 A1 | 4/2010 | Nhep | |
| 2010/0215330 A1* | 8/2010 | Sokolowski et al. | 385/136 |
| 2010/0215331 A1* | 8/2010 | Gonzalez et al. | 385/137 |
| 2010/0290787 A1* | 11/2010 | Cox | 398/115 |
| 2011/0033155 A1 | 2/2011 | Daikuhara | |
| 2011/0091169 A1 | 4/2011 | Van Der Meulen et al. | |
| 2011/0280527 A1 | 11/2011 | Tamura | |
| 2012/0039571 A1* | 2/2012 | Ciechomski et al. | 385/78 |
| 2012/0163829 A1* | 6/2012 | Cox | 398/115 |
| 2012/0230636 A1 | 9/2012 | Blockley et al. | |
| 2012/0328253 A1 | 12/2012 | Hurley et al. | |
| 2013/0146355 A1* | 6/2013 | Strasser et al. | 174/72 A |

OTHER PUBLICATIONS

Sung Chul Kang, International Search Report for PCT/US13/61530, Jan. 16, 2014, Daejeon Metropolitan City, Republic of Korea.

* cited by examiner

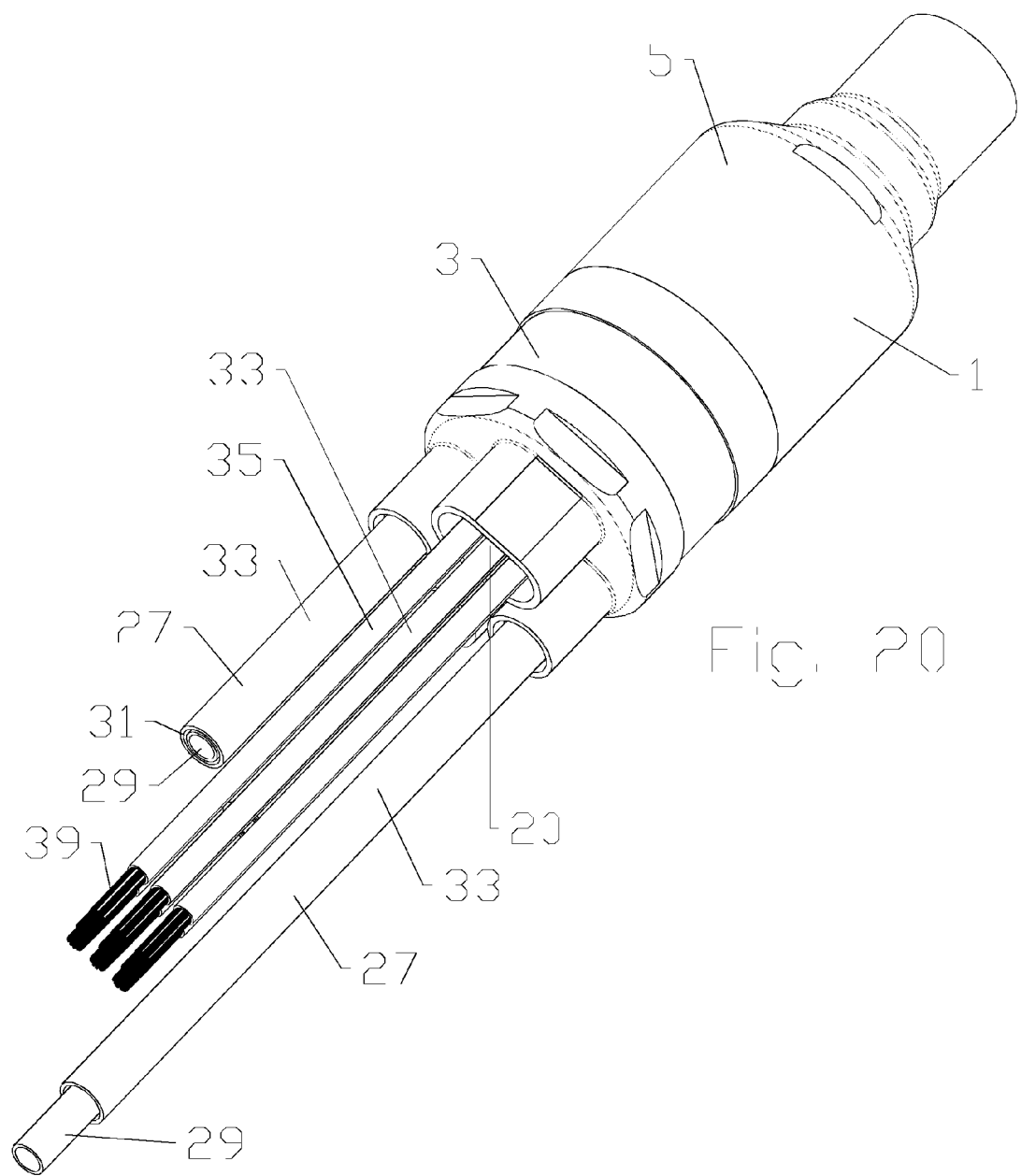

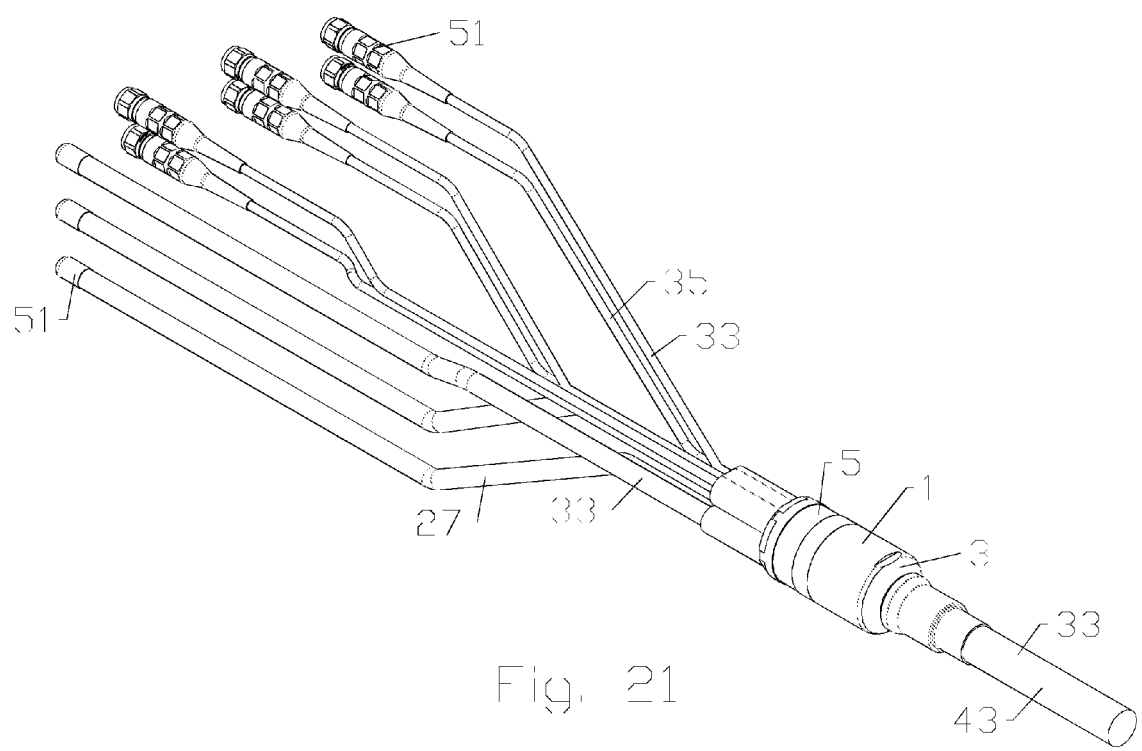

US 9,235,021 B2

OPTICAL FIBER / ELECTRICAL COMPOSITE CABLE ASSEMBLY WITH SEALED BREAKOUT KIT

BACKGROUND

1. Field of the Invention

This invention relates to hybrid electrical and optical cable assemblies. More particularly, the invention relates to a electrical and optical hybrid cable with an in-line transition housing between the hybrid cable and individual termination jumpers for the several conductors of the cable.

2. Description of Related Art

The wireless communications industry is changing from traditional signal delivery from ground based transceivers delivering/receiving the RF signal to/from the antenna atop the radio tower via bulky/heavy/high material cost metal RF coaxial cable to optical signal delivery to a tower top mounted transceiver known as a remote radio unit (RRU) or remote radio head (RRH) with implementation of FTTA (Fiber To The Antenna) cabling.

FTTA cabling may be simplified where power and/or control signal conductors are provided with optical signal conductors in a single hybrid cable.

Optical conductors may be fragile, requiring great care to properly terminate.

Prior hybrid cable RRU/RRH terminations have employed an over-voltage protection and/or distribution box for terminating each of the electrical and optical conductors as individual jumpers. These additional enclosures require field termination of the several conductors atop the radio tower, increasing installation time and labor requirements. Further, each break in the conductors provides another opportunity for signal degradation and/or environmental fouling.

Factory terminated hybrid cable assemblies are known. However, these assemblies may apply splices to the conductors, require a relatively large in-line break-out/splice enclosure and/or utilize environmental seals which fail to positively interlock the jumpers therewith, which may increase the potential for cable and/or individual conductor damage to occur.

Therefore, an object of the invention is to provide an optical fiber/electrical cable assembly with sealed breakout kit and/or cable assembly and method of use that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 20 is a schematic isometric view of the transition housing and cabling of FIG. 18.

FIG. 21 is a schematic isometric view of one end of an exemplary cable assembly with a transition housing and connector terminated furcation tubes installed

DETAILED DESCRIPTION

The inventor has recognized that individual conductors of a hybrid electrical and optical conductor cable may be broken out into individual jumpers, without requiring termination and/or or splicing of the individual and/or groups of related conductors, by removing outer protective layers of the hybrid cable and providing protective sheaths for each of the conductors and/or conductor groups, the protective sheaths positively interlocked with the hybrid cable via a transition housing.

A typical hybrid cable, for example an FTTA cable, includes multiple metal (such as copper) conductors and single or multiple optical fibers in a subunit. A fiber subunit may include multiple optical fibers (such as 250 um or 900 um). In order to connect conductors and/or fibers directly to the RRH, optical fiber and power conductors are separated from the hybrid cable as individual jumpers, the jumpers protected with separate furcation tubes.

Figure 1:
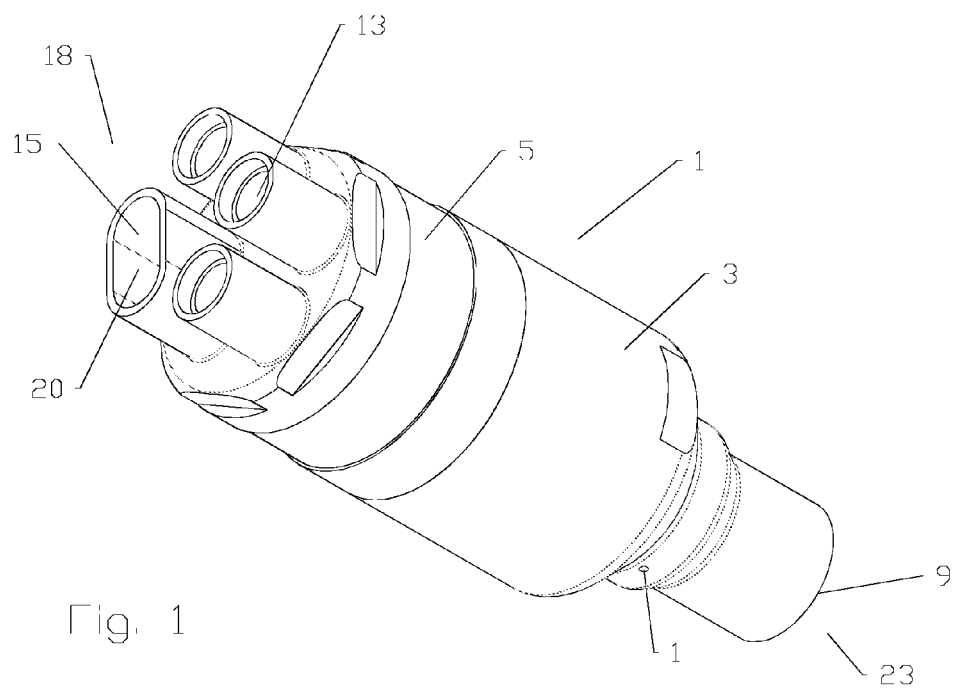
FIG. 1 is a schematic isometric view of an exemplary transition housing.
Figure 2:
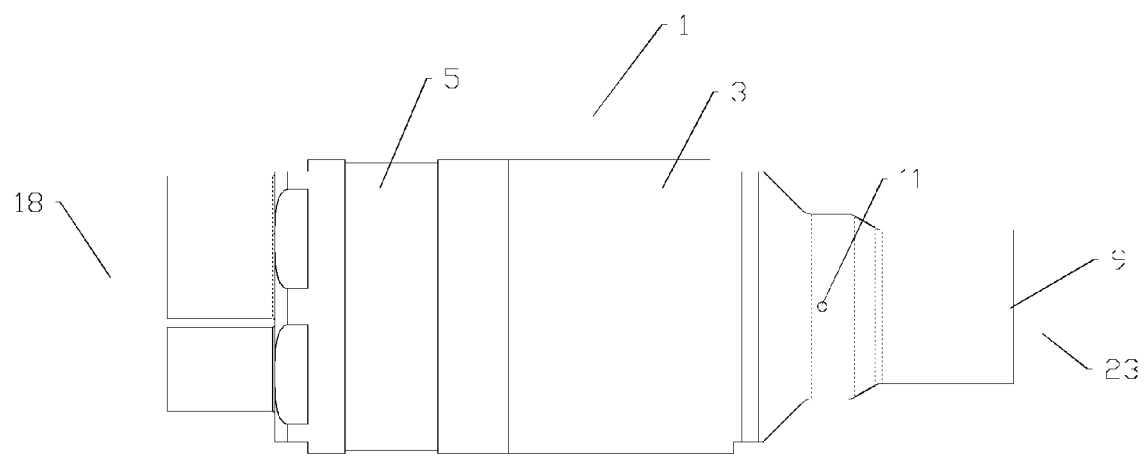
FIG. 2 is schematic side view of the transition housing of FIG. 1.
Figure 3:
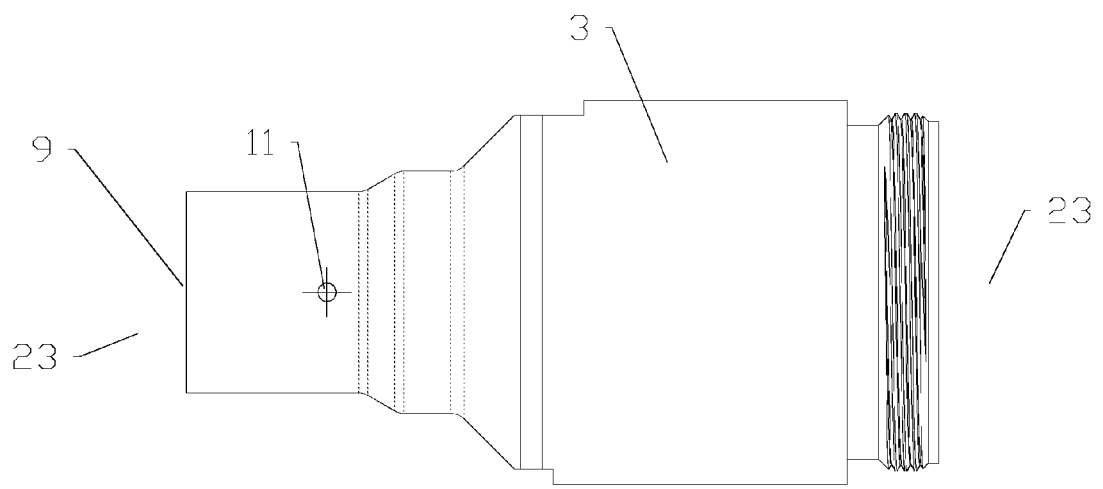
FIG. 3 is a schematic side view of a cable portion of the transition housing of FIG. 1.
Figure 4:
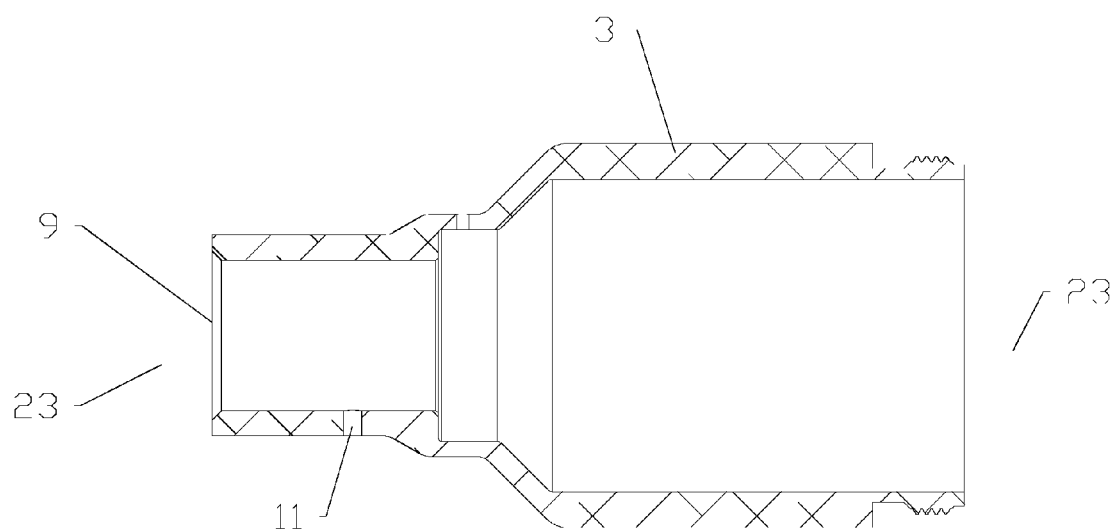
FIG. 4 is schematic cut-away side view of the cable portion of FIG. 3.
Figure 5:
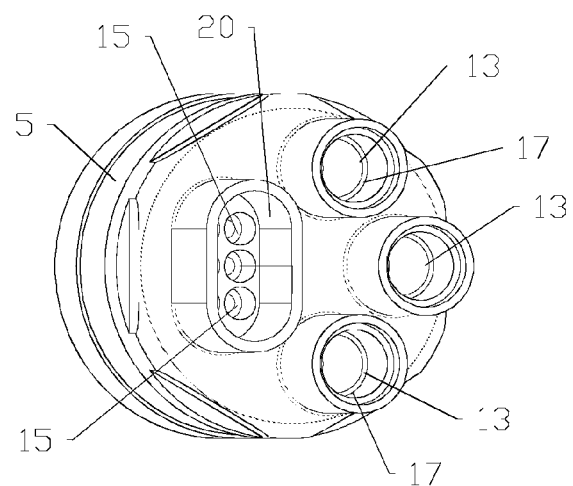
FIG. 5 is a schematic isometric view of a furcation portion of the transition housing of FIG. 1.
Figure 6:
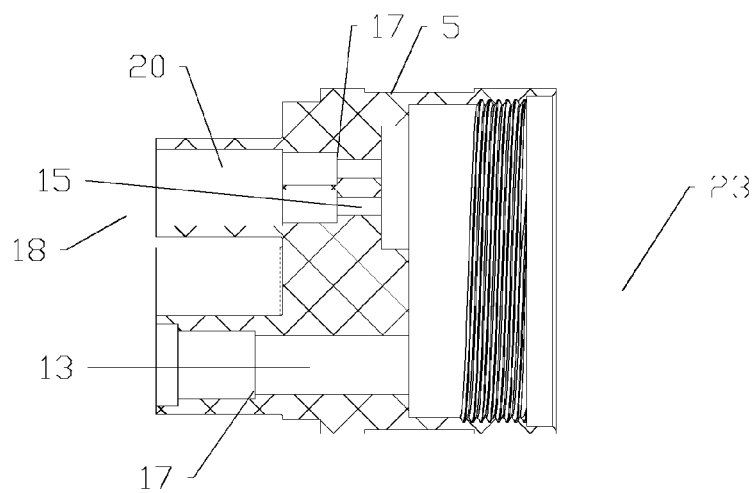
FIG. 6 is a schematic cut-away side view of the furcation portion of FIG. 5.
Figure 7:
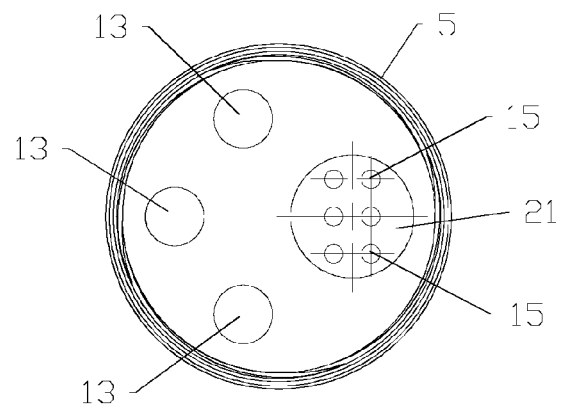
FIG. 7 is a schematic end view of the transition end of the furcation portion of FIG. 6.
Figure 8:
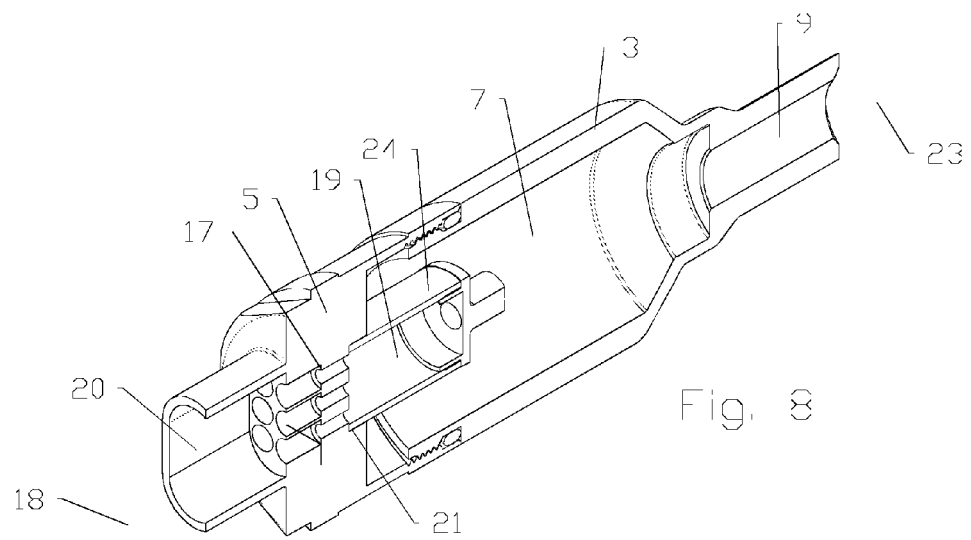
FIG. 8 is a schematic isometric cut-away view of the transition housing of FIG. 1.
Figure 9:
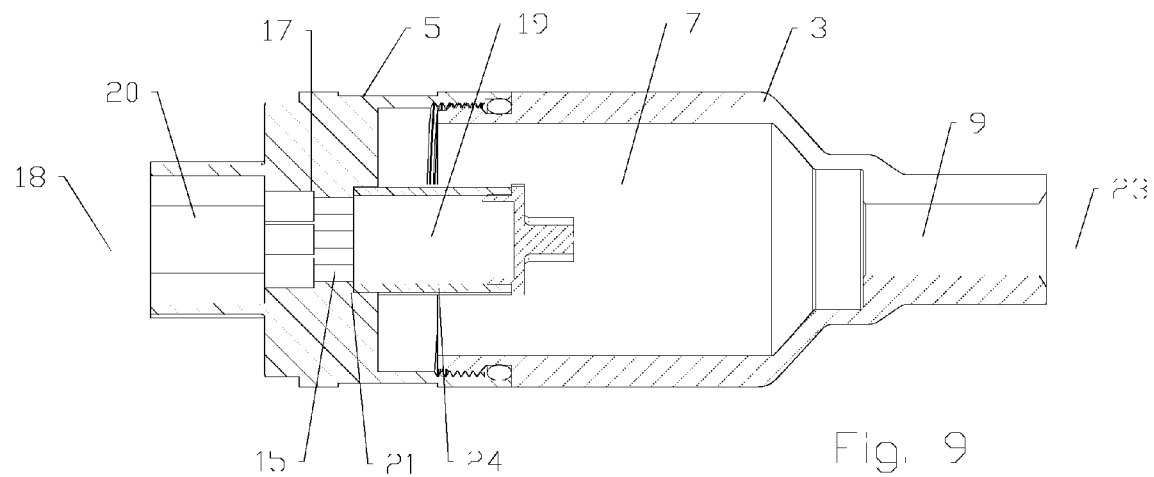
FIG. 9 is schematic side section view of the transition housing of FIG. 8.
Figure 10:
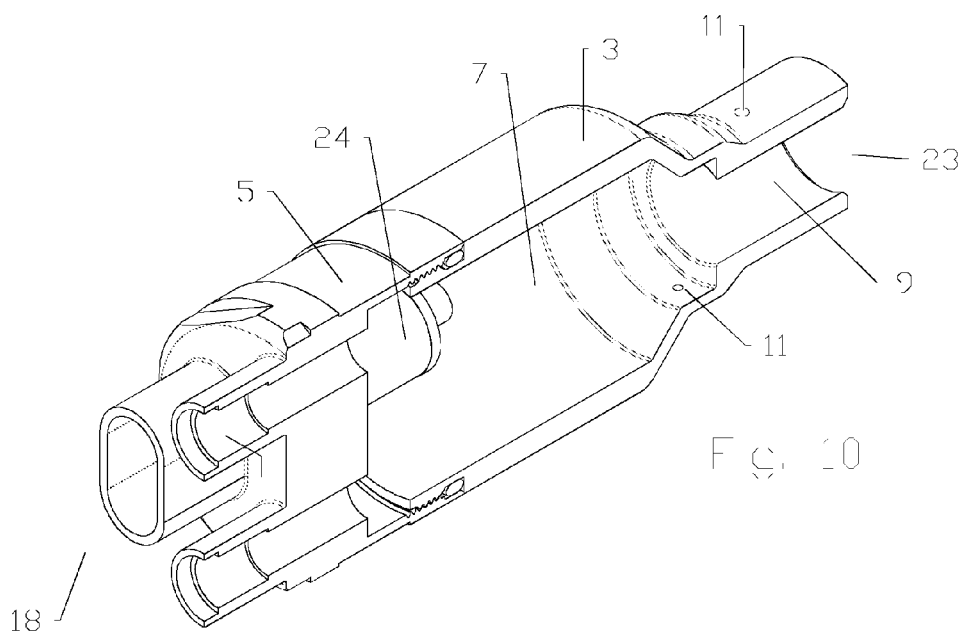
FIG. 10 is another schematic isometric cut-away view of the transition housing of FIG. 1.
Figure 11:
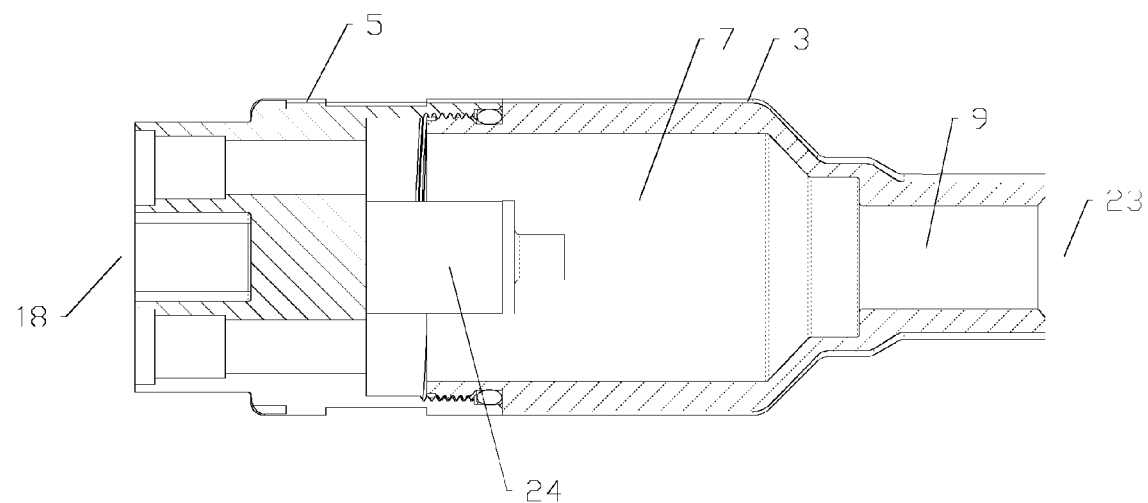
FIG. 11 is schematic side section view of the transition housing of FIG. 10.
Figure 12:
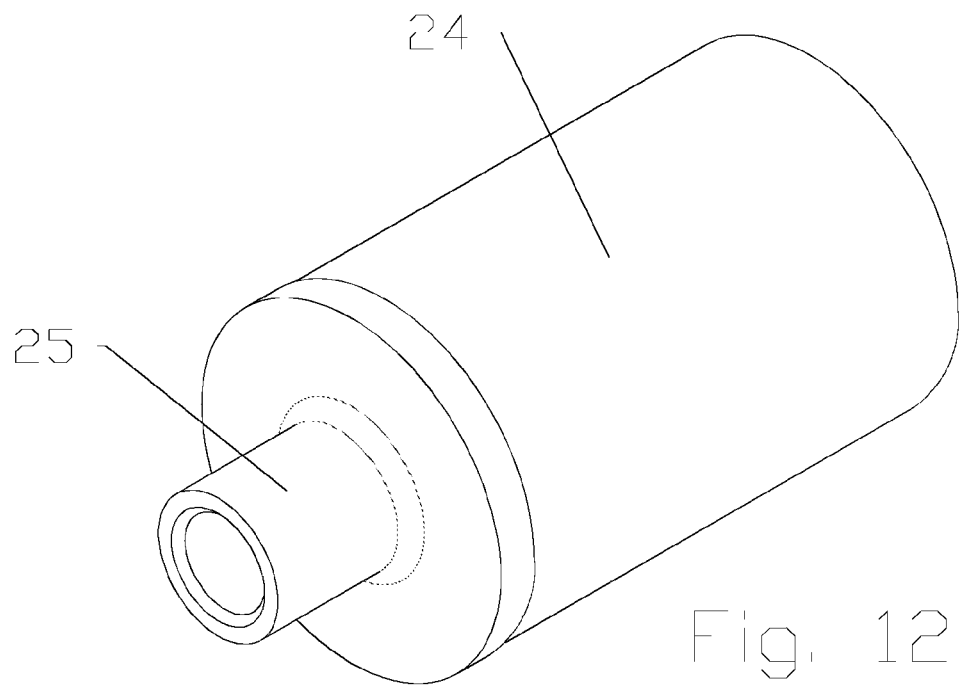
FIG. 12 is a schematic isometric view of the inner wall portion and end stop of the transition housing of FIG. 1.
Figure 13:
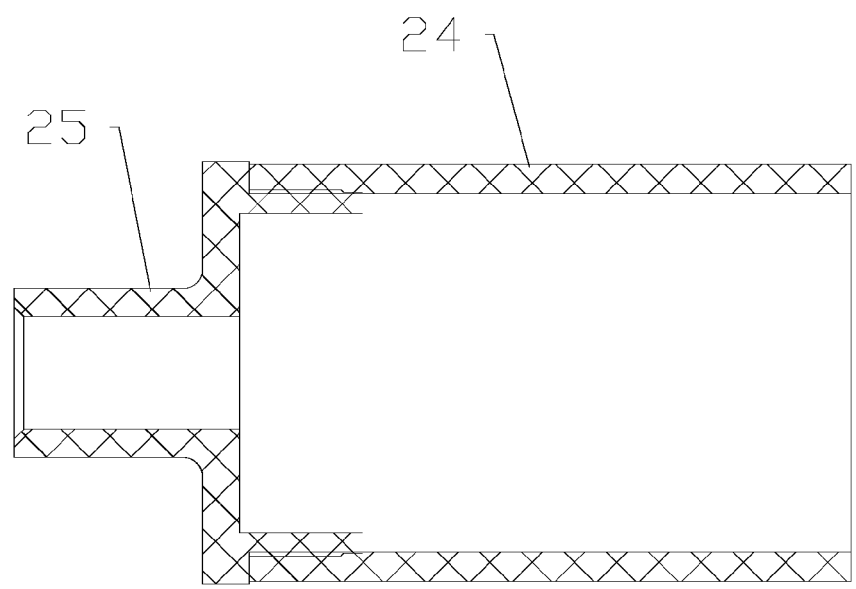
FIG. 13 is a schematic cut-away side view of the inner wall portion of FIG. 12.

A transition housing 1, for example as shown in FIGS. 1-15, surrounds the transition of the hybrid cable to the furcation tubes. The transition housing 1 may be provided, for example, as a polymer or metal material housing with a cable portion 3 (FIGS. 3 and 4) and a furcation portion 5 (FIGS. 5-7) that mate within one another to enclose a break-out area 7 (best shown in FIGS. 8-11). The transition housing 1 may be formed, for example, by injection molding, machining and/or insert molding.

The cable portion 3 includes a cable port 9 dimensioned to receive the hybrid cable. The cable port 9 may be dimensioned to enable the cable portion 3 to be drawn over the cable end and any shielding and/or outer jacket of the hybrid cable during installation to allow mounting the furcation portion 5 close to the end of the outer jacket. The cable portion 3 can then be drawn toward the seated furcation portion 5 for sealing of the furcation area 7. The mating between the cable and furcation portions 3, 5 may be, for example, via threads, interference and/or snap fit, or alternatively via fasteners such as screws or bolts. The cable and/or furcation portions 3, 5 may include one or more adhesive ports 11 for injecting an adhesive and/or sealant into the furcation area 7 and/or exhausting these areas as the adhesive and/or sealant is applied.

The adhesive may be an epoxy with elastomeric properties.

The furcation portion 5 includes one or more conductor ports 13 and fiber ports 15. The conductor ports 13 may be dimensioned to receive conductor furcation tubes therethrough, into the furcation area 7.

Figure 16:
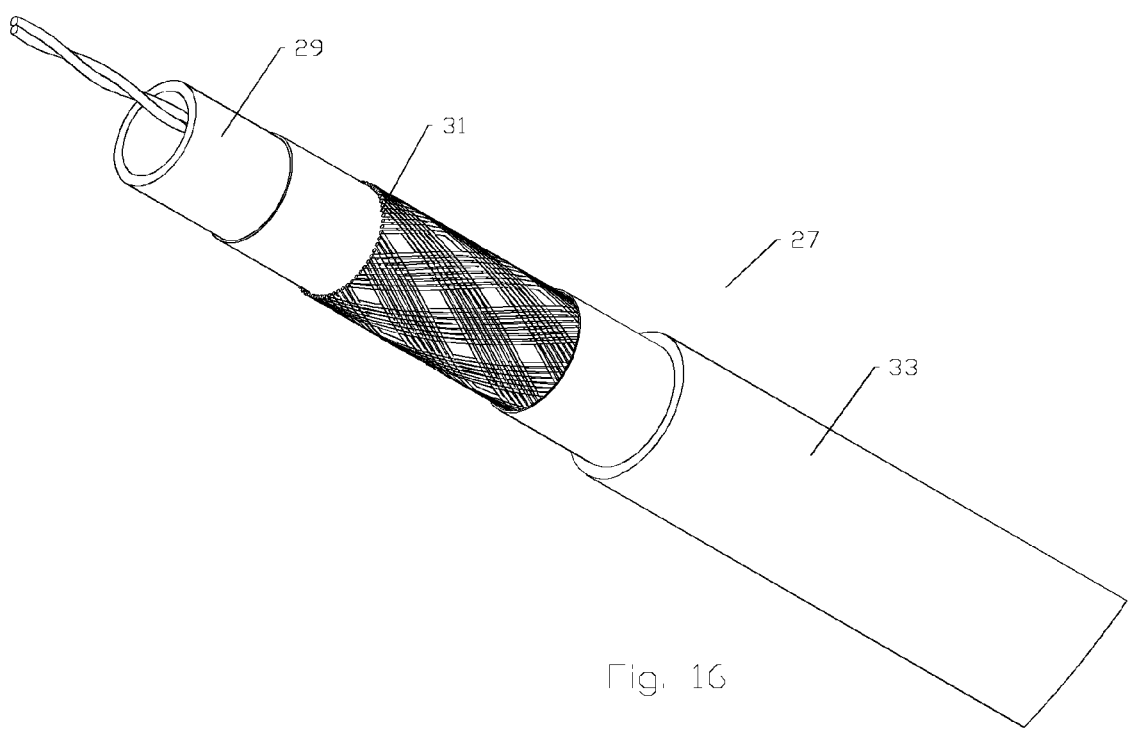
FIG. 16 is a schematic isometric view of an exemplary conductor furcation tube.
Figure 17:
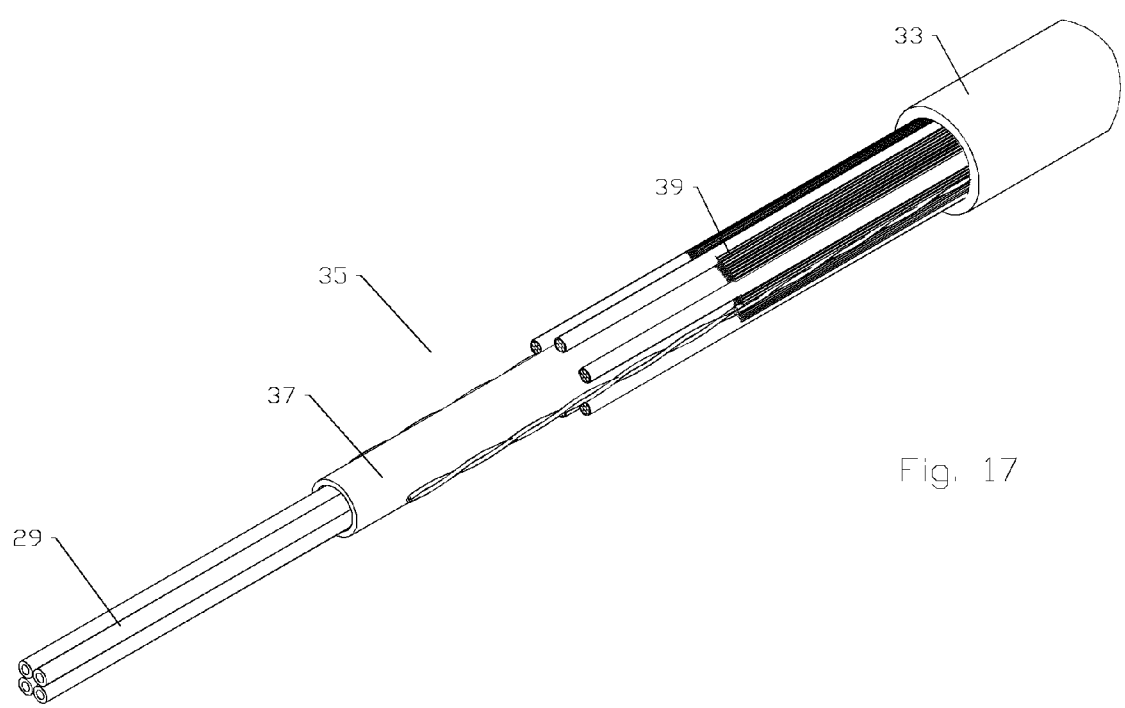
FIG. 17 is a schematic isometric view of an exemplary fiber furcation tube.

The conductor furcation tubes 27 may include, for example, an inner tube 29, a metallic shield layer 31 and outer jacket 33, for example as shown in FIG. 16. Shielded conductor furcation tubes 27 are described in detail in commonly owned U.S. patent application Ser. No. 13/791,248, titled "Shielded Electrical Conductor Furcation Assembly" filed 8 Mar. 2013 by Nahid Islam, hereby incorporated by reference in its entirety. The fiber furcation tubes 35 may include, for example, an inner jacket 37, a fiber and strength layer 39 and outer jacket 33, for example as shown in FIG. 17. Damage-resistant fiber furcation tubes 35 are described in detail in commonly owned U.S. patent application Ser. No. 13/832,131, titled "Rugged Furcation Tube" filed 15 Mar. 2013 by Nahid Islam, hereby incorporated by reference in its entirety. For example, each fiber furcation tube 35 may be dimensioned to receive either 900 um or 250 um optical fibers. Further, each fiber furcation tube 35 may include multiple inner tubes 29, within the inner jacket 37, for separate fibers and/or fiber bundles. The inner tubes 29 may be dimensioned to pass through the fiber ports 15, into the fiber area 19, as shown for example in FIG. 18.

The fiber ports 15 may be dimensioned with a furcation shoulder 17 (see FIG. 6) dimensioned to seat the fiber and strength layer 39 and/or outer jacket 33 of a fiber furcation tube 37, the remainder of the fiber port 15 dimensioned to pass the fiber and/or fiber bundle therethrough. Several fiber ports 15 may be grouped together with an adhesive well 20 projecting from the furcation end 18, for adhering several fiber furcation tubes 35 further to one another, to increase a pull-off resistance characteristic of each individual fiber furcation tube and/or allow an increased amount of adhesive to be applied thereto, so that the furcation end 18 is provided with an elastomeric characteristic to protect the individual fiber furcation tubes 35 from buckling against a lip of the respective fiber ports 15.

The conductor ports 13 may also include a furcation shoulder 17 at the furcation end 18, to allow an increased amount of adhesive to be applied thereto, so that the furcation end 18 is provided with an elastomeric characteristic to increase a pull-off resistance characteristic and/or protect the conductor furcation tubes 27 from buckling against a lip of the conductor port 13.

The fibers 47 are isolated from the furcation area 7 to prevent their immobilization in adhesive injected within the furcation area 7. Thereby, the fibers 47 may be isolated from stresses generated by thermal expansion differentials that may exist between metal and/or polymeric portions of the assembly and the fibers. That is, the fibers 47 are free floating between the cable 43 and the fiber furcation tube 35.

Figure 14:
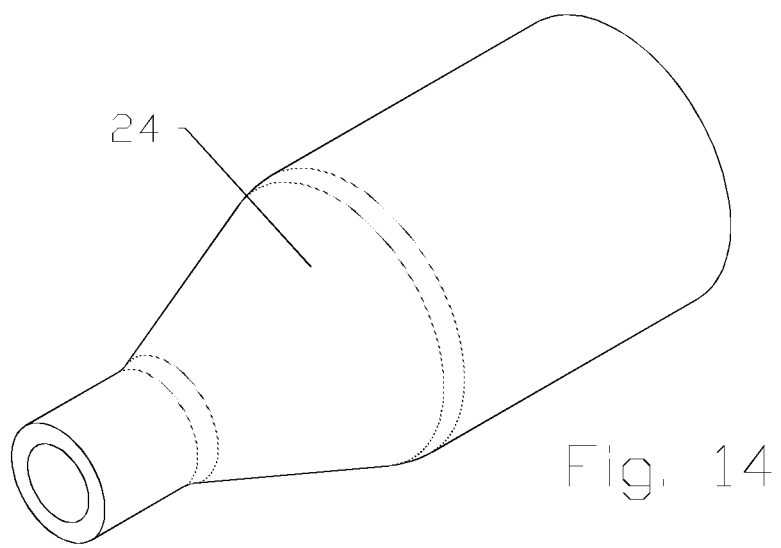
FIG. 14 is a schematic isometric view of an alternative inner wall portion.
Figure 15:
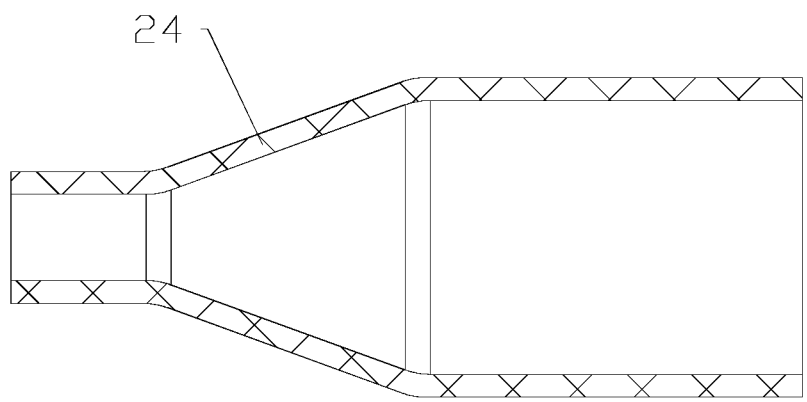
FIG. 15 is a schematic cut-away side view of the inner wall portion of FIG. 14.
Figure 18:
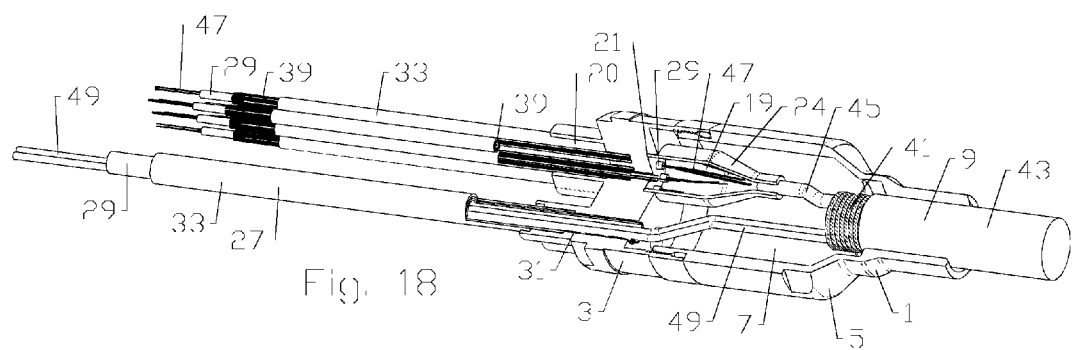
FIG. 18 is a schematic isometric partial cut-away view of a transition housing with cable and furcation tubes installed.

The fiber area 19 (see FIGS. 8 and 9) wherein the individual fibers transition from the fiber bundle 45 of the cable 43 to their respective fiber furcation tubes 35 may be provided, for example, via an inner wall portion 24 that seats into a fiber area shoulder 21 (see FIG. 7-9) of the transition end 23 of the furcation portion 5 surrounding the fiber ports 15 and is sealed against a fiber bundle 45 of the cable 43 by an end stop 25 sealing between an outer jacket of the fiber bundle 45 and the inner wall portion 24. Where the inner wall portion 24 is cylindrical, the end stop 25 may be provided as a polymeric annular gasket or the like, seated sealing on an inner diameter against the outer jacket of the fiber bundle 45 and on an outer diameter against an inner diameter of a bore of the inner wall portion 24, as shown for example in FIGS. 12 and 13. Alternatively, the inner wall portion 24 may be formed with, for example, a conical reduction proximate the transition end 23, wherein the transition end 23 has an inner diameter proximate an outer diameter of the outer jacket of the fiber bundle 45, for example as best shown in FIGS. 14, 15 and 18. One skilled in the art will appreciate that that the fiber bundle 45 may be a fiber subunit of the cable 43 which encloses a single fiber 47 or a plurality of fibers 47.

Figure 19:
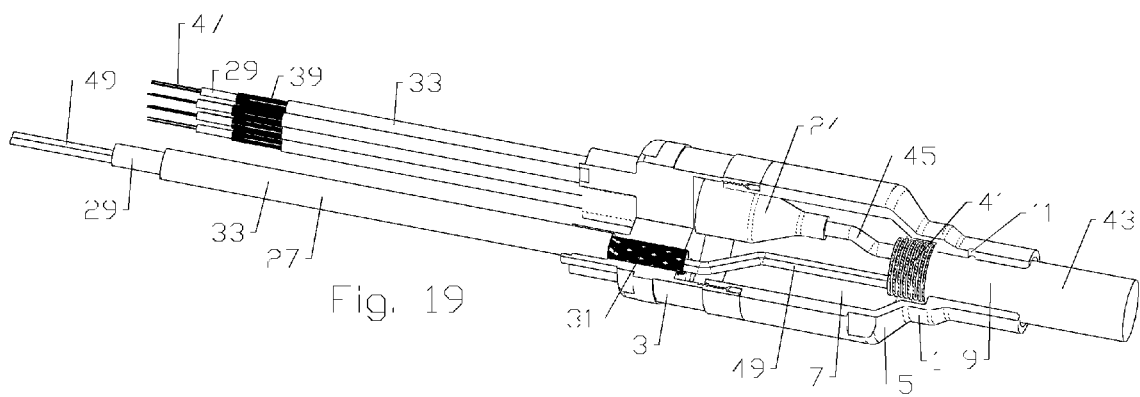
FIG. 19 is another schematic isometric partial cut-away view of the transition housing and cabling of FIG. 18.

To manufacture an assembly, for example as shown in FIGS. 18-21, the cable 43 has the outer jacket 33 and any shield 41 stripped back to expose desired lengths of the fiber 47, electrical conductors 49 and/or fiber bundles 45. The cable portion 3 is advanced over the conductors and over the outer jacket 33 of the cable 43 and the end stop 25 (if present) and inner wall portion 24 advanced over the fiber bundle 45. The furcation portion 5 is advanced over the conductors, each of the conductors and/or conductor bundles inserted to respective fiber and/or conductor furcation tubes 35, 27, the conductor furcation tubes 27 passed through conductor ports 13 and fiber furcation tubes 35 seated in their respective furcation shoulders 17, for example as shown in FIGS. 18 and 19. The metallic shield layer 31 of the conductor furcation tubes 27 may be coupled to a drain wire and/or the shield 41 of the cable 43, for example via a shield interconnection, such as a tie wire, fastener, soldering or the like. The shield interconnection and fiber area 19 (inner wall portion 24 sealed against the transition end 23 of the furcation portion 25 by seating in the fiber area shoulder 21 and closed by the end stop 24) are enclosed by returning the cable portion 3 towards the furcation portion 5 and coupling them together (see FIG. 19).

The furcation area 7 may then be sealed/encapsulated by injecting a desired adhesive (also known as a sealant or caulk) into the adhesive port(s) 11 of the cable and/or furcation portions 3, 5, until the adhesive is observed, for example, at the cable port 9 and/or conductor ports 13. Further adhesive may be applied to seal the fiber furcation tubes 35 into the furcation shoulders 17 of the fiber ports 15 and the fiber furcation tubes 35 to one another within the adhesive well 20 of the furcation portion 5. Splaying a fiber portion of the fiber and strength layer 39 so that it extends within the furcation shoulder 17 and/or further into the adhesive well 20 (see FIG. 30) provides secure retention of the fiber furcation tubes to the furcation portion 5 and thereby to the assembly.

The transition housing 1, individual conductor ports 13 and/or the adhesive well 20 may be further sealed by applying shrink tube or pultruded seals therearound.

The assembly may be further completed by applying desired connectors to each of the conductors at the end of their respective furcation tubes, as best in FIG. 21.

A grounding lug may be applied to the transition housing and/or a grounding lead may be routed from the junction of the cable shield/drain wire and conductor furcation tube shields to the sidewall of the assembly (if conductive) or in a sealed fashion to an exterior of the assembly to provide a ready grounding point for the cable assembly.

In a further embodiment, the inner wall portion 24 may be provided including the fiber port(s) 15 at the furcation end 18. Thereby, the furcation portion 5 may be simplified to require only a corresponding fiber area shoulder 21 to receive the inner wall portion 24, and a much larger port to surround and communicate the fiber ports 15 of the inner wall portion 24, to the adhesive well 20. Thereby, the manufacture of the furcation portion 5 is simplified by transferring the formation of these several small holes to a much smaller overall element, the inner wall portion 24, where the overall scale of the element is closer to that of the dimensions of the fiber port(s) 15, simplifying the corresponding mold and/or machining requirements.

One skilled in the art will appreciate that the assembly provides a splice-free cable conductor distribution with significant pull-apart strength and improved environmental sealing in an assembly with minimal dimensions that eliminates the need for distribution boxes and/or on-site conductor termination during installation. Further, because the fibers 47 and/or electrical conductors 49 may lay freely within their respective inner tubes 29 from the transition housing 1 to the connector 51, the fibers 47 and/or electrical conductors 49 are free of thermal expansion and or tensile stress that may be applied to their respective fiber and conductor furcation tubes 35, 27.

| Table of Parts |
| --- |
| 1 transition housing |
| 3 cable portion |
| 5 furcation portion |
| 7 furcation area |
| 9 cable port |
| 11 adhesive port |
| 13 conductor port |
| 15 fiber port |
| 17 furcation shoulder |
| 18 furcation end |
| 19 fiber area |
| 20 adhesive well |
| 21 fiber area shoulder |
| 23 transition end |
| 24 inner wall portion |
| 25 end stop |
| 27 conductor furcation tube |
| 29 inner tube |
| 31 metallic shield layer |
| 33 outer jacket |
| 35 fiber furcation tube |
| 37 inner jacket |
| 39 fiber and strength layer |
| 41 shield |
| 43 cable |
| 45 fiber bundle |
| 47 fiber |
| 49 electrical conductor |
| 51 connector |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A cable breakout kit, comprising:
a cable portion;
a furcation portion with at least one fiber port; and
an inner wall portion;
the cable portion and the furcation portion dimensioned to couple with one another, enclosing a furcation area;
the inner wall portion coupled to the furcation portion and a fiber bundle of the cable, enclosing a fiber area within the furcation area; the fiber area coupled to the at least one fiber port.

2. The cable breakout kit of claim 1, wherein the inner wall portion couples with the fiber bundle via an end stop seated on an outer diameter of the fiber bundle, the inner wall portion seating against an outer diameter of the end stop.

3. The cable breakout kit of claim 1, wherein the inner wall portion is dimensioned to seat against an outer diameter of the fiber bundle.

4. The cable breakout kit of claim 1, further including at least one fiber furcation tube and at least one conductor furcation tube.

5. The cable breakout kit of claim 4, wherein the at least one conductor furcation tube includes a metallic shield layer.

6. The cable breakout kit of claim 1, further including an adhesive well projecting from a furcation end, surrounding the at least one fiber port.

7. The cable breakout kit of claim 6, wherein the adhesive well surrounds a plurality of the fiber ports.

8. The cable breakout kit of claim 1, further including a furcation shoulder at a furcation end of the at least one fiber port; the furcation shoulder dimensioned to receive a fiber and strength layer of a fiber furcation tube.

9. The cable breakout kit of claim 1, wherein the at least one fiber port is dimensioned to receive an inner tube of a fiber furcation tube into the fiber area.

* * * * *